(12) United States Patent
Van Den Berg et al.

(10) Patent No.: US 9,532,545 B2
(45) Date of Patent: Jan. 3, 2017

(54) UNMANNED CLEANING VEHICLE

(71) Applicant: LELY PATENT N.V., Maassluis (NL)

(72) Inventors: Karel Van Den Berg, Maassluis (NL); Jan Lambertus Pastoor, Maassluis (NL); Jacob Derk Weijers, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 8 days.

(21) Appl. No.: 14/430,057

(22) PCT Filed: Aug. 20, 2013

(86) PCT No.: PCT/NL2013/050607
§ 371 (c)(1),
(2) Date: Mar. 20, 2015

(87) PCT Pub. No.: WO2014/046540
PCT Pub. Date: Mar. 27, 2014

(65) Prior Publication Data
US 2015/0245587 A1 Sep. 3, 2015

(30) Foreign Application Priority Data

Sep. 21, 2012 (NL) ...................................... 2009498

(51) Int. Cl.
*A47L 11/00* (2006.01)
*A01K 1/01* (2006.01)

(52) U.S. Cl.
CPC .................................... *A01K 1/01* (2013.01)

(58) Field of Classification Search
None
See application file for complete search history.

(56) References Cited

FOREIGN PATENT DOCUMENTS

| NL | 101214 C2 | 11/2000 |
|---|---|---|
| WO | WO 00/70936 A1 | 11/2000 |
| WO | WO 2010/095928 A1 | 8/2010 |

*Primary Examiner* — Eric Golightly
(74) *Attorney, Agent, or Firm* — Birch, Stewart, Kolasch & Birch, LLP

(57) ABSTRACT

An unmanned wheeled vehicle is configured to clean a first floor surface at a first height level, while supported on a second floor surface at a second height level, wherein the first height level is higher than the second height level. The vehicle comprises a main body comprising a support side and a cleaning side, and a support device to support the main body on the second floor surface, wherein the main body comprises at the cleaning side a contact cleaning device configured to clean the first floor surface. A tilting device tilts the main body between a tilted position in which the cleaning side of the main body can be moved over the first floor surface without contact between the contact cleaning device and the first floor surface, and a cleaning position, in which the contact cleaning device is in contact with the first floor surface.

20 Claims, 3 Drawing Sheets

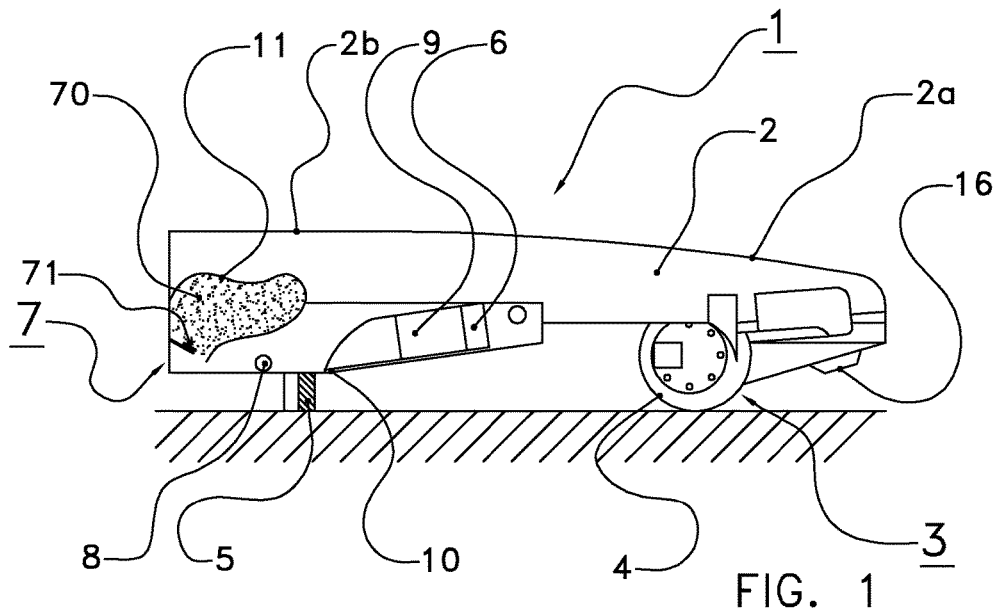
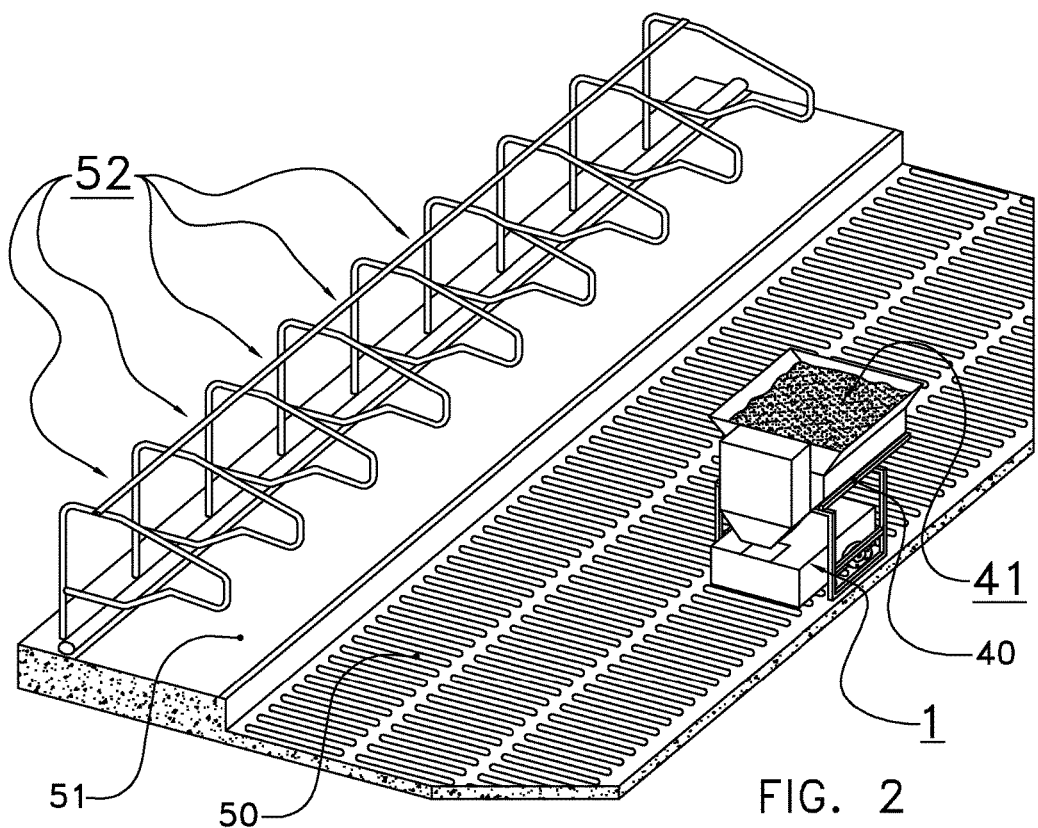

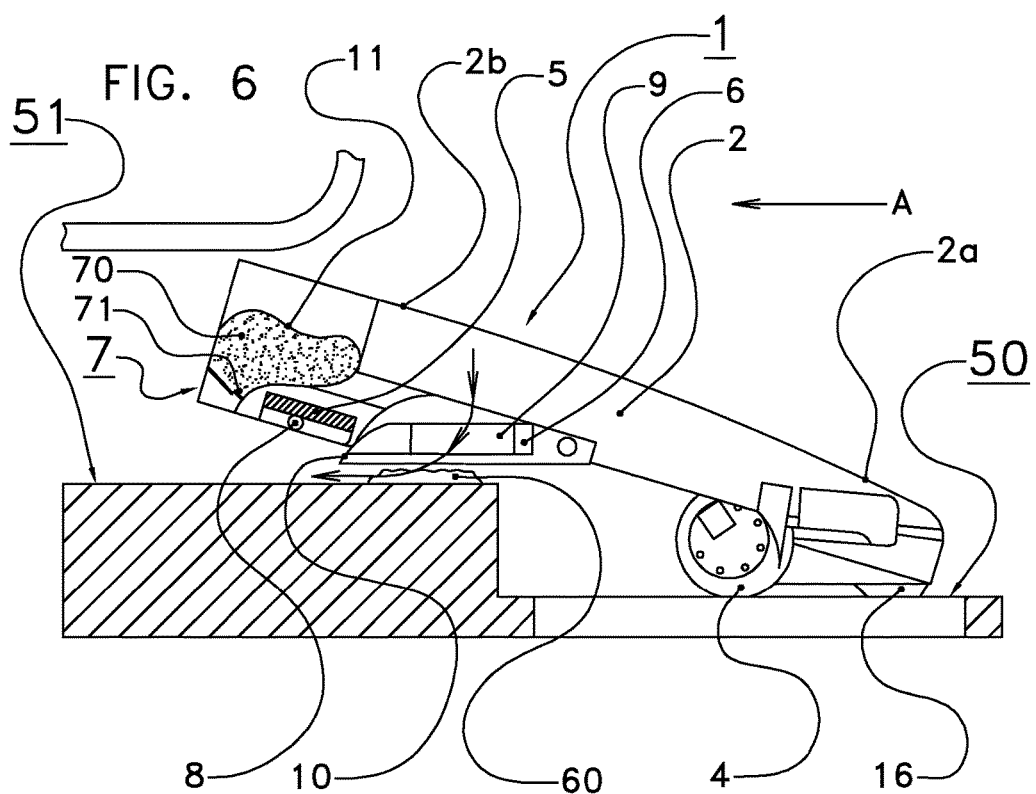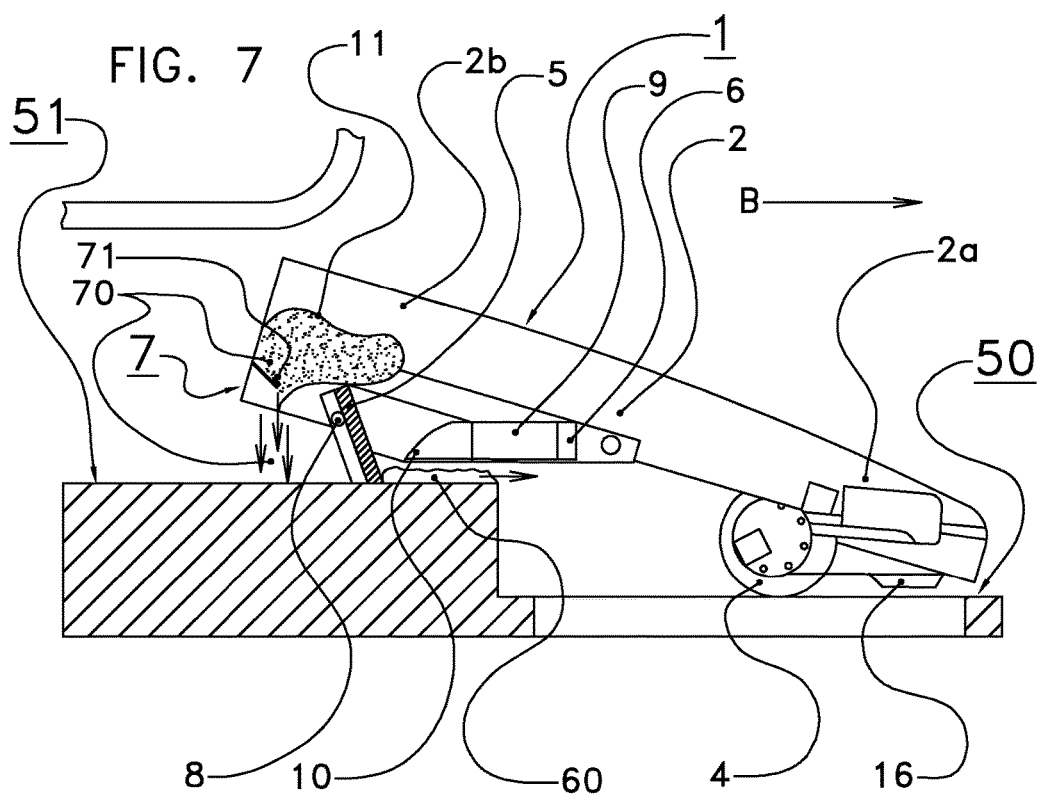

UNMANNED CLEANING VEHICLE

The present invention relates to a an unmanned vehicle for cleaning the floor of an accommodation of an animal.

Accommodation of animals, such as a cow shed, need to be regularly cleaned. This may be time consuming work. Therefore, there is a need for unmanned vehicles which can be used for cleaning of the floor of an accommodation of an animal.

In some accommodations, such as a cow shed, the floor is divided in different floor surfaces having different heights levels. For example, the floor surface of a cubicle is usually at a higher level than the stable floor.

A drawback of these height differences is that an unmanned vehicle cannot easily be driven over the complete floor of the accommodation. In view thereof there is a need for unmanned vehicles which is configured to clean a first floor surface, for example a cubicle floor, while the vehicle is driven over a second floor surface, for example a stable floor, wherein the first floor surface is at a higher level than the second floor surface.

NL 1012141 discloses an unmanned vehicle adapted to be used in a stable, such as a cow shed. The vehicle is provided with a manure displacing device which is disposed at a distance from the vehicle and/or is capable of being moved to a place at a distance from the vehicle. The manure displacing device comprises a telescopic carrier and/or a hingeable arm construction carrying a manure slide.

The unmanned vehicle is configured to be arranged on the stable floor next to a cubicle floor so that by movement of the telescopic carrier and/or the hingeable arm the manure slide can be moved over a substantial distance of the cubicle floor to clean it.

A drawback of the known unmanned vehicle is that the telescopic carrier and/or a hingeable arm is a relative complex construction which may be unreliable.

It is an aim of the present invention to provide an improved unmanned vehicle for cleaning the floor of an accommodation of an animal, in particular a floor having different height levels, or at least to provide an alternative therefor.

The invention provides an autonomous unmanned wheeled vehicle for cleaning the floor of an accommodation of an animal, the vehicle being configured to clean a first floor surface that is at a first height level, while the vehicle is at least partially being supported on a second floor surface that is at a second height level, wherein the first height level is higher than the second height level, wherein the vehicle comprises:
a main body comprising a support side and a cleaning side, and
a support device connected to the main body at the support side thereof to at least partially support the main body on the second floor surface, wherein the main body comprises at the cleaning side a contact cleaning device configured to clean the first floor surface by moving over the first floor surface while in contact with the first floor surface, characterized in that the vehicle comprises a tilting device to automatically tilt the main body between a tilted position in which the cleaning side of the main body is movable over the first floor surface without contact between the contact cleaning device and the first floor surface, and a cleaning position, in which the contact cleaning device is in contact with the first floor surface, when the cleaning side is moved over the first floor surface.

The main body of the unmanned vehicle is tiltable between a cleaning position and a tilted position. In the tilted position, the cleaning side of the vehicle is arranged at a higher level than in the cleaning position. This tilted position can advantageously be used to move the contact cleaning device in a first direction over at least a part of the first floor surface to be cleaned. Thereafter, the tilting device may be actuated to tilt the main body to the cleaning position. In this cleaning position, the contact cleaning device is in contact with the first floor surface to clean the first floor surface.

When the contact cleaning device is in contact with the first floor surface, the vehicle may be driven in a second direction, opposite to the first direction, so that the contact cleaning device is moved over the first floor surface to clean the first floor surface. The dirt on the first floor surface, such as a cubicle floor surface, may for example be pushed onto the second floor surface, such as a stable floor, where it can be removed by further cleaning.

By using a tilting device a reliable and efficient vehicle is obtained to position and move a contact cleaning device over the floor surface to be cleaned without contact between the contact cleaning device and the first floor surface.

In an embodiment, the contact cleaning device comprises a manure scraper device mounted at the cleaning side of the main body, wherein in the cleaning position of the vehicle, the manure scraper device will extend from the main body down to or below the first height level, and in the tilted position the manure scraper device is spaced from the first height level. The manure scraper device may have a manure slide to be placed on the first floor surface. The manure slide may have any suitable form to efficiently remove dirt from the first floor surface by scraping the manure scraper device over the first floor surface. The manure slide may be made of any suitable material such as metal or plastics material.

In an embodiment, the manure slide may be movable, for example rotatable, between different cleaning positions, such as a first cleaning position for cleaning the first floor surface and a second cleaning position to clean the second floor surface. The manure slide may also be movable into a transport position, where the manure slide is at a relatively large distance from the floor surface. Such a transport position may increase the space available to move the cleaning side above the first floor surface.

In an embodiment, the contact cleaning device may comprise one or more brushes, in particular one or more cylindrical brushes rotatably driven about an axis of rotation. Any other suitable contact cleaning device for cleaning the first floor surface by contact between the contact cleaning device and the first floor surface may also be applied.

Advantageously, the contact cleaning device is provided to clean the floor of the accommodation of an animal, such as in particular a cubicle for an animal, even more in particular a lactating animal. Material to be removed may comprise material to be found in such an accommodation, in particular bedding material such as (dirty) sawdust or sand, manure, and even (dried) milk rests. However, other materials that happen to be present on the floor can also be removed. Note that it may be possible to remove material also with other means provided on the vehicle, as will be explained further below.

In an embodiment, the main body is pivotable with respect to the support device about a pivot axis, wherein the tilting device is configured to change a relative position of the pivot axis with respect to the main body between a first position in which a center of mass of the main body is located at one side of the pivot axis, and a second position in which the center of mass of the main body is located at an opposite side of the pivot axis.

The main body is tiltable with respect to the support device about a pivot axis. By changing the relative position of the pivot axis with respect to the main body, the position of the center of mass of the main body with respect to the pivot axis may change. As a result, the main body can selectively be moved, dependent on the relative position of the center of mass of the main body with respect to the pivot axis, between the tilted position and the cleaning position. It is also possible to provide a wheel shifter arranged to shift the pivot axis with respect to the main body. For example, the wheel shifter comprises an actuator for displacing the wheel axle(s). As the main body will be tiltable about the wheel axle(s) in this case, shifting the latter also means effectively shifting the relative position of the pivot axis with respect to the center of mass of the main body.

In other embodiments, the vehicle comprises a pump system, comprising two compartments, partly filled with fluid, and a pump arranged to pump fluid from one of the compartments to another of the compartments, thereby shifting the center of mass with respect to the pivot axis. This system can be compared to fuel shift systems in airplanes.

It is remarked here that these embodiments, as well as all other embodiments in which gravity is used for tilting, in other words all embodiments in which the position of the center of mass is shifted with respect to a tilting axis, control of this shifted position is advantageous in controlling the pressure which the contact cleaning device exerts on the floor surface. In particular, the vehicle may comprise a tilt sensor arranged to detect tilting of the vehicle, at least of the main body. The vehicle may further, as in all embodiments, comprise a control unit arranged to control the operation of the vehicle. The sensor is operatively coupled with the control unit, and provides a tilt signal thereto. Advantageously, the control unit is arranged for controlling the tilting of the main body, based on the tilt signal. The provision of such a sensor signal based tilt control for this embodiment, as well as other embodiments to be described hereinbelow, allows a number of advantages, as will be explained below.

When the tilting starts, this will be detected by the tilt sensor, such as a mercury switch, a gyroscope or an accelerometer. Usually, tilting is a runaway process, once started, the tilt will only increase up to an abutment or the like. The center of mass will then have moved over some additional distance with respect to the pivot axis. But having such a maximum tilt also leads to a maximum downforce on the abutment, which may hinder the moving of the vehicle due to increased friction. To counter this problem, the control may be arranged to shift the center of mass back over such an amount that the vehicle remains in the tilted position or in the cleaning position, respectively, in particular to within a predetermined horizontal distance of the pivot axis. By shifting back the center of mass, the moment of force for the center of gravity, to be compensated by the moment of force at the abutment, will then diminish. Similarly, for the cleaning position, thus after tilting back from the tilted position, the pressure with which the contact cleaning device presses on the floor can be set and/or kept within certain limits. Note that herein, the position of the center of mass will itself be known, based on the configuration of the vehicle as a whole. However, in particular the contact cleaning device and the parts directly surrounding it may become heavily soiled, such that even the tilting behaviour and the downforce may be influenced. By setting the position of the center of gravity/mass, one becomes able to set the downforce. Simple mechanical equations will provide the settings to achieve a required downforce.

Another reason for setting the downforce by shifting the position of the center of mass is increased wheel slip. If it is detected by the vehicle that wheelslip increase, such as by means of a wheel slip detector, e.g. a wheel rev counter in combination with a gps or the like, the pressure on the driven wheel(s) may be increased by shifting the center of gravity as described above. Similarly, if the vehicle is provided with a cleaning quality detector, such as an optical camera and image recognition software, thus able to detect if more manure remains than desired, it is advantageously possible to control shifting of the center of mass based on a reading of the cleaning quality detector, and in particular increase the pressure on the contact cleaning device in that case.

In an embodiment, the support device comprises one or more wheels rotatable about a substantially horizontal axis of rotation, wherein the pivot axis is formed by the axis of rotation.

The vehicle may comprise one or more wheels to movably support the vehicle at the support side thereof on the second floor surface. The wheels can be driven by a motor or other actuator to move the vehicle over the second floor surface in a driving direction perpendicular to the axis of rotation. Preferably, the vehicle comprises two wheels arranged at opposite sides of the vehicle. Each of these two wheels may comprise its own actuator so that the direction of movement of the vehicle can be controlled by controlling the actuators of the two wheels.

The one or more wheels may have a common axis of rotation. By using the axis of rotation of the one or more wheels as the pivot axis for the main body, the main body can tilt between the cleaning position and the tilted position by rotation of the main body about the axis of rotation of the one or more wheels. In such an embodiment, no extra pivot axis has to be created between the main body and the support device to tilt the main body between the tilted position and the cleaning position.

In a further embodiment, the support device comprises a pivotable support arm, wherein a first end of the pivotable support arm is pivotably mounted on the main body, and wherein the one or more wheels are mounted on a second end of the pivotable support arm, wherein a pivoting movement of the pivotable support arm with respect to the main body moves the pivot axis between the first position and the second position, and wherein the tilting device comprises at least one actuator to pivot the pivotable support arm with respect to the main body.

The relative position of the center of mass of the main body with respect to the pivot axis can be used to move the main body between the tilted position and the cleaning position. By mounting the one or more wheels on a pivotable support arm the pivot axis formed by the axis of rotation of the one or more wheels can be moved between the first position and the second position. An actuator, preferably a linear actuator, such as a pneumatic or hydraulic cylinder may be used to selectively move the pivotable support arm between the first position and the second position.

In an alternative embodiment, the main body is pivotable with respect to the support device about a pivot axis, wherein the tilting device comprises a movable mass, wherein the movable mass is movable between a first position in which a center of mass of the main body is located at one side of the pivot axis, and a second position in which the center of mass of the main body is located at an opposite side of the pivot axis, and wherein the tilting device comprises at least one actuator to move the movable mass between the first and second position.

The main body can be moved between the tilted position and the cleaning position by moving the center of mass of the main body between opposite sides of the pivot axis. This movement can be created by moving the pivot axis with respect to the center of mass and/or by moving the center of mass with respect to the pivot axis. The center of mass of the main body can be moved with respect to the pivot axis by providing a movable mass which is at least movable in a direction substantially perpendicular with respect to the pivot axis.

In another alternative embodiment, the tilting device comprises an extendable support element movable between a retracted position wherein the vehicle is in the cleaning position, and an extended position in which the support element extends downwards from the main body and wherein the vehicle is in the tilted position. Herein, the extendable support element is extendable between a position that contacts the ground or a surface that is at a fixed height with respect to the ground, and a position in which said element does not contact said ground or said surface. Note herein that for example the axle of a wheel that is kept on the ground is also such a surface that has a fixed height with respect to the ground.

In embodiments, the extendable support element comprises an adjustable abutment element, arranged to adjust the tilted position, in particular with respect to a height of the contact cleaning device above the second floor level. This is useful in preventing too much tilting (and of course avoiding too little tilting), for example when adjusting the vehicle for use in a new stable. In particular, the vehicle can in this way be adapted to a particular height of the first floor level, such as for certain cubicles.

An extendable support element can be used, when the main body is normally in the cleaning position to push the main body from the cleaning position to the tilted position. The extendable support may, in the extended position, for example be supported by the first or second floor surface or by the support device. In an alternative embodiment, when the main body is normally in the tilted position, the extendable support element may be used to move the main body from the tilted position to the cleaning position.

Additionally, the extendable support element may comprise a sliding surface or a passive wheel. Herein, a sliding surface is any rounded surface that shows less friction with the floor than a flat surface of the same area, and a passive wheel is a non-driven wheel, that is preferably smaller than the driven wheel(s), such as a roller or the like.

In an embodiment, the vehicle comprises one or more air blowers. One or more air blowers may be used to blow dry litter material, for example sawdust or straw, from the first floor surface to be cleaned, as it may be desirable to only clean dirt, such as manure, and wet litter material which will not be blown away by the one or more air blowers.

The one or more air blowers can be mounted on the main body and may be movable between a blowing position and a rest position.

In an embodiment, the vehicle comprises a spreading device for spreading a litter material such as sawdust or straw, the spreading device comprising a container for holding the litter material. It is desirable that the unmanned vehicle comprises a spreading device for spreading litter material such as sawdust and/or straw after the first floor surface has been cleaned.

The spreading device may be configured to spread the litter material at the cleaning side of the vehicle, but in addition or as an alternative also at a side of the device so that the litter material can be spread in a direction substantially perpendicular to a main driving direction of the vehicle. The latter embodiment has the advantage that the litter material such as sawdust or straw may be spread over the first floor surface, while the vehicle passes by over the second floor surface in a direction substantially parallel to an edge of the first floor surface.

In an embodiment, the vehicle comprises a control system to control operation of the vehicle apparatus. The control system may comprise a computer. It may also comprise a wireless connection for receiving external instructions.

In embodiments, the vehicle comprises at least one sensor, each configured to provide a sensor signal, and a control device configured to control the tilting device and/or to control movements of the vehicle on the basis of said at least one sensor signal. Such sensor(s) may help in controlling the automatic tilting of the vehicle.

In an embodiment, the vehicle comprises a pressure control device to control the pressure with which the contact cleaning device is pressed on the first floor surface during cleaning of the first floor surface.

In an embodiment, the contact cleaning device is configured to also clean the second floor surface and/or the vehicle comprises a second contact cleaning device to clean the second floor surface. In such embodiment the vehicle can be used to clean the first floor surface and the second floor surface.

The invention also relates to an assembly of an unmanned vehicle and a stationary home unit. A stationary home station may be provided to cooperate with the unmanned vehicle. The stationary home unit may for example be used to charge one or more batteries of the unmanned vehicle, which one or more batteries may be configured to provide power to the different parts of the vehicle, such as driving actuators, cleaning devices, sensors and control devices. The stationary home station may also comprise a container for litter material so that a container of the vehicle can automatically be filled with litter material in the home station. The volume of the container of the home station may be substantially larger than the volume of the container of the vehicle. The home station may also be used to provide other materials or fluids to the vehicle and/or for cleaning of the vehicle, in particular the contact cleaning device.

The invention further relates to a method of using an unmanned vehicle as claimed in any of the preceding claims, to clean a first floor surface at a first height level, while the vehicle is at least partially supported on a second floor surface at a second height level, wherein the first height level is higher than the second height level, the method comprising the steps of:
  moving the cleaning side of the main body in a first direction over at least a part of the first floor surface to be cleaned, while the main body is in the tilted position,
  transferring the main body from the tilted position to the cleaning position,
  cleaning the first floor surface with the contact cleaning device by moving the main body in a second direction, opposite to the first direction, while the main body is in the cleaning position.

An embodiment of an unmanned vehicle according to the invention will now be described in further detail, by way of example only, with reference to the accompanying drawings, in which:

FIG. 1 shows a side view of an unmanned vehicle according to a first embodiment of the invention;

FIG. 2 shows a perspective view of the vehicle of FIG. 1 in a stable, when coupled to a home station;

FIG. 6 shows a side view of the vehicle of FIG. 1 in the tilted position partially above a cubicle floor; and FIG. 7 shows a side view of the vehicle of FIG. 1 in the cleaning position during cleaning of a cubicle floor.

FIG. 1 shows an embodiment of a unmanned vehicle for cleaning the floor of an accommodation of an animal, generally indicated by reference numeral 1. The vehicle may, for example, have a length of for example 1000 to 1500 mm and a width of 600 to 1200 mm.

Figure 3:
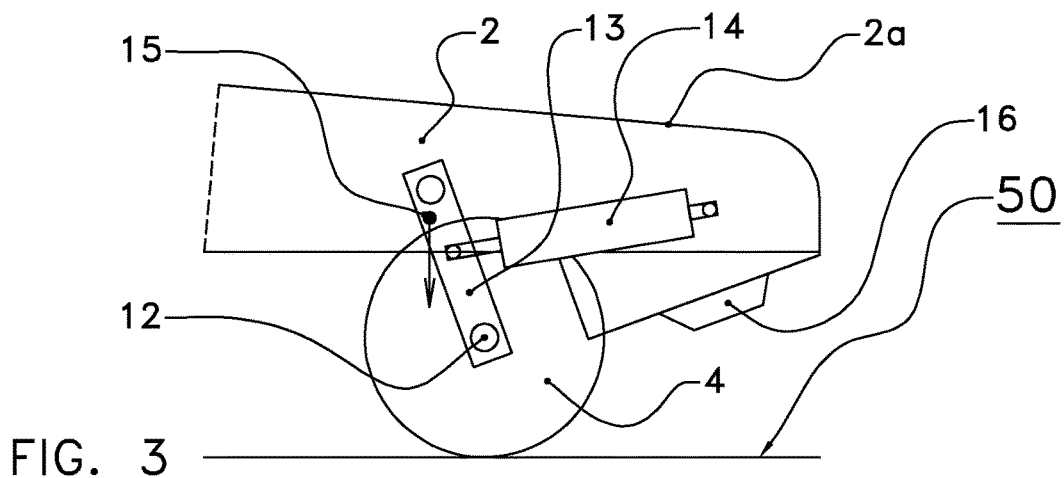
FIG. 3 shows a schematic view of the tilting device at the support side of the vehicle of FIG. 1 in the cleaning position.

The vehicle comprises a main body 2 and a support device 3. The support device 3 comprises two wheels 4 at opposite sides of the vehicle 1. The wheels 4 are connected to actuators for driving the two wheels in a desired direction. Each of the wheels can be independently actuated by the actuators so that the vehicle 1 can be steered by controlling the driving speed of each of the wheels separately. Actuation of the actuators is controlled by a control device. A relative position sensor, such as a distance sensor to a wall or other object, and/or an absolute position, such as a GPS sensor may be used to determine the position of the vehicle. The vehicle 1 may also comprise one or more sensors to determine the presence of an animal or other moving objects. On the basis of the measured position and, possibly the determination of an animal or other moving objects, the trajectory of the vehicle 1 may be controlled.

The main body 2 comprises a support side 2a and a cleaning side 2b. The support side 2a and the cleaning side 2b are spaced in the main driving direction of the vehicle 1.

The cleaning side 2b of the main body 2a comprises a manure slide 5, an air blower device 6 and a litter material spreading device 7.

The manure slide 5 is a contact cleaning scraper device which can clean the floor of the stable by scraping the manure slide 5 over the floor surface. The manure slide 5 is rotatable about an rotation axis 8 between at least a first cleaning position, a second cleaning position and a transport position. The first and second cleaning position make it possible to clean a floor surface at different height levels. The first cleaning position and the second cleaning position can for example be used to clean floor surfaces at different height levels.

Figure 4:
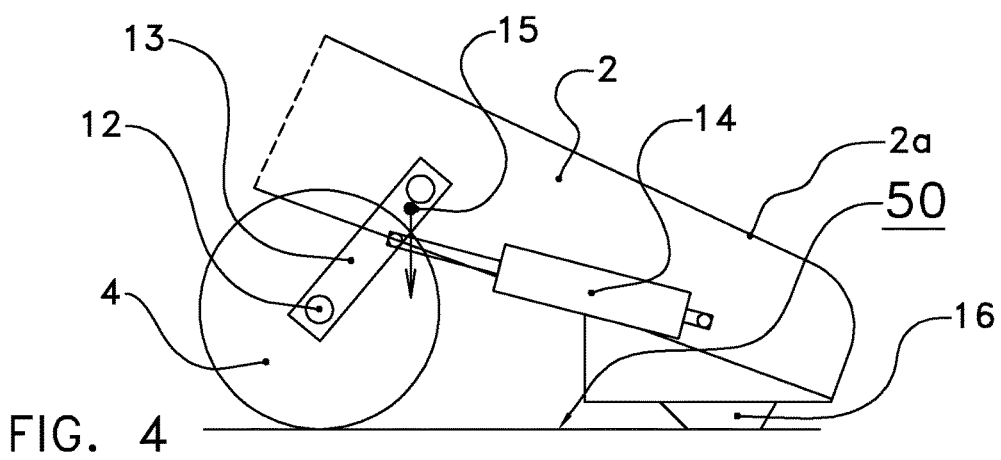
FIG. 4 shows a schematic view of the tilting device at the support side of the vehicle of FIG. 1 in the tilted position.

For example, the first cleaning position is suitable to clean a floor surface of a cubicle, as shown in FIG. 4, and a second cleaning position is suitable to clean a floor surface of a stable floor, as shown in FIG. 1. In alternative embodiments, the manure slide 5 may be a stationary manure slide only configured to clean a floor surface at a specific height range, or two or more manure slides may be provided to clean floor surfaces at different height ranges.

The vehicle 1 may comprise a pressure control device to control the pressure with which the manure slide 5 is pressed on the floor surface during cleaning of the floor surface.

The air blower device 6 comprises one or more air blowers 9, such as fans, and a nozzle 10 to direct the air flow to a specific area of interest. The air blower device 6 can be used to blow away dry litter material such as sawdust and straw from an area to be cleaned before the area is actually cleaned by the manure slide 5. This avoids that dry litter material which is still relatively fresh is already discarded as a result of cleaning with the manure slide 5.

After cleaning, new litter material 70, such as sawdust or straw, may be spread on the cleaned surface by the litter material spreading device 7. The litter material spreading device 7 comprises a container 11 containing a quantity of litter material 70, for example saw dust or straw. The litter material 70 is fed from the container 11 to a nozzle to spread the litter material 70 over a floor surface. A valve element 71 is provided to selectively open and close the nozzle.

It is remarked that the litter material spreading device 7 may also be used to spread litter material on a floor surface which has not been cleaned directly before. In such case a nozzle for spreading the litter material may be provided at the side of the vehicle so that the litter material may be spread from the vehicle when passing by the respective floor surface.

The vehicle 1 may comprise one or more sensors to determine whether a floor surface has to be cleaned. These sensors may be capable of directly detecting the state of the floor surface. It is also possible that a control device of the vehicle 1 is programmed to follow a certain trajectory within the stable or that the vehicle 1 is wirelessly connected to a central control unit in the stable configured to direct the vehicle 1 to parts of the floor surface to be cleaned.

FIG. 2 shows the vehicle of FIG. 1 parked at a stationary home station 40. The home station 40 is located at a suitable location on a stable floor 50. The unmanned vehicle 1 may drive autonomously over the stable floor 50.

The home station 40 is configured to assist the vehicle in performing its functions. For example, the power required for performing the required actions of the vehicle 1 is delivered by batteries mounted in the vehicle 1. The home station 40 may be provided with a battery charger to charge the batteries of the vehicle 1. Further, the home station 40 comprises a relative large container 41 with litter material to fill, when required, automatically the container 11 of the vehicle 1.

The stable floor 50 over which the vehicle 1 drives is located at a first height level. The vehicle 1 can be used to clean this stable floor 50 by driving around in the position as shown in FIG. 1. However, some parts of the stable, in particular the cubicle floor 51 of the cubicles 52 are arranged at a higher height level. The threshold between the stable floor 50 and the cubicle floor 51 prevents that the vehicle 1 can simply drive on the cubicle floor surface 51 for cleaning.

Nevertheless, the vehicle 1 is configured to clean at least partially the cubicle floor 51. For this reason, the vehicle comprises a tilting device to tilt the main body 2 about the axis of rotation 12 of the wheels 4 between a cleaning position as shown in FIGS. 1 and 7, and a tilted position as shown in FIG. 6. In the cleaning position, the manure slide 5 will be in contact with the a floor surface and a pressure will be provided to press the manure slide 5 on the floor surface. In the tilted position, the cleaning side 2b of the main body 2 will be spaced from the floor surface without contact between the manure slide and the floor surface.

The vehicle 1 may comprise a control device to control the position of the main body 2 with respect to the support device 3.

FIGS. 3 and 4 show schematically the tilting device of the vehicle 1 at the support side 2a of the main body 2. The tilting device comprises a pivotable support arm 13. A first end of the pivotable support arm 13 is pivotably mounted on the main body 2. The two wheels 4 are mounted on a second opposite end of the pivotable support arm 13. The axis of rotation 12 of the wheels 4 forms a pivot axis for the tilting device. It is remarked that, in an alternative embodiment, another rotation axis may be provided as a pivot axis for the main body 2.

The tilting device further comprises an actuator 14 to pivot the pivotable support arm 13 with respect to the main body 2. The actuator 14 may be any suitable actuator, for example a linear actuator such as a pneumatic or hydraulic cylinder, or an electromotor. By displacing the support arm 13 between the first position and the second position, the main body 2 of the vehicle 1 can be positioned in the cleaning position and the tilted position respectively.

In FIG. 3, the support arm 13 is positioned in a first position, in which a center of mass 15 of the main body 2 is located at the cleaning side 2*b* (left side in FIG. 1) of the axis of rotation 12. As a result of this relative position of the center of mass 15 of the main body 2 with respect to the axis of rotation 12 of the wheels 4, the main body 2 will remain in the cleaning position where it is supported by the wheels 4 and the manure slide 5 at the cleaning side 2*b* of the main body 2, as shown in FIG. 1.

In FIG. 4, the support arm 13 is positioned in the second position. In this second position the wheels 4 and their axis of rotation 12 are displaced in the direction of the cleaning side 2*b* of the main body 2. This displacement is obtained by actuation of the actuator 14. In the second position the center of mass 15 of the main body 2 is located at an opposite side of the axis of rotation 12 (in FIG. 4 at the right side of the axis of rotation 12).

As a result of this relative position between the center of mass 15 and the axis of rotation 12, the main body will tilt to the tilted position, as shown in FIG. 4. In this tilted position, the main body 2 is supported by the wheels 4 and a slide block 16 mounted at the support side 2*a* of the main body 2. The slide block 16 is configured to partially support the main body 2, when positioned in the tilted position. The slide block 16 will slide over the floor surface when the vehicle 1 is driven over the floor surface.

Figure 5:
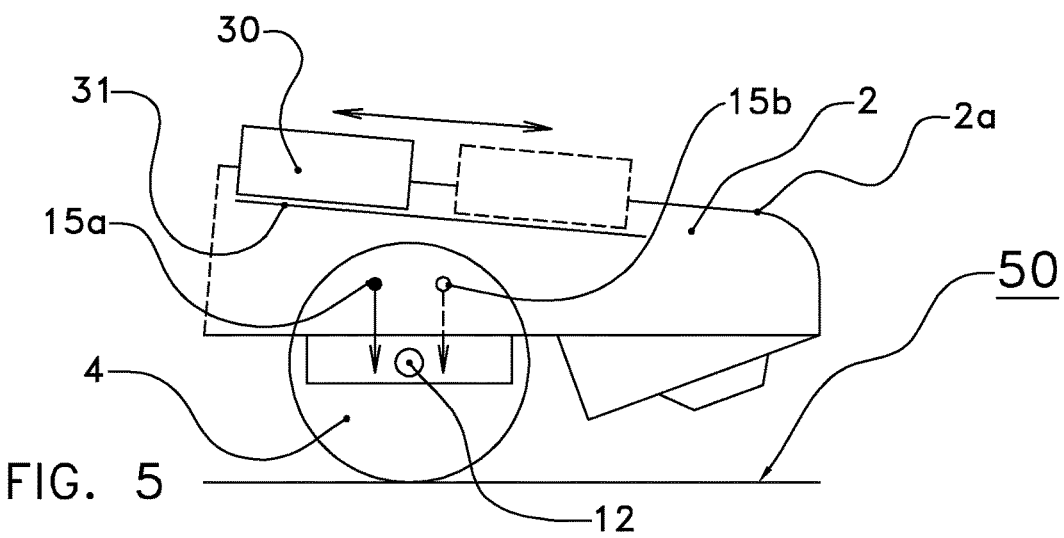
FIG. 5 shows a schematic view of an alternative embodiment of a tilting device in a vehicle according to the invention.

FIG. 5 shows an alternative embodiment of a tilting device. In this embodiment, the axis of rotation 12 of the wheels 4 is mounted at a fixed location on the main body 2. The tilting device comprises a movable mass 30 which is movable between a first position (solid lines) and a second position (dashed lines) over a rail 31. An actuator (not shown) may be provided to move the movable mass between the first position and the second position. Any other way of moving the movable mass between the first position and the second position may also be applied.

Moving the movable mass 30 results in a displacement of the center of mass of the main body 2. In the first position of the movable mass 30, the center of mass 15*a* is located at the cleaning side 2*b* of the axis of rotation 12. In this first position, the main body 2 will tilt to the cleaning position where it is supported by the wheels 4 and the manure slide 5.

In the second position of the movable mass, the center of mass 15*b* is located at the opposite side of the axis of rotation 12 (at the right side in FIG. 5). As a result, the main body will tilt to the tilted position where the main body 2 is supported by the wheels 4 and the slide block 16.

Further alternative embodiments of a tilting device to move the main body between the cleaning position and the tilted position may also be applied. In an example of such alternative embodiment, the tilting device may comprise an extendable support element movable between a retracted position in which the support element is retracted and an extended position in which the support element extends downwards from the main body, wherein the vehicle will be in the cleaning position, when the support element is positioned in the retracted position, and in the tilted position when the support element is positioned in the extended position.

FIGS. 6 and 7 show how the vehicle 1 can be used to clean the cubicle floor 51. In FIG. 6, the main body 2 of the vehicle 1 is in the tilted position. In this tilted position, the cleaning side, in particular the manure slide 5 is positioned at a higher height level than the cubicle floor 51. As a result, the cleaning side 2*b* of the main body 2 can be moved over the cubicle floor 51, while the vehicle 1 is completely supported on the stable floor 50 by the wheels 4 and the slide block 16.

In this embodiment, the manure slide 5 is rotated about the rotation axis 8 to the transport position in which the manure slide 5 is positioned at a relative high position. In this transport position, the manure slide 5 provides further space to move the vehicle 2 with its cleaning side 2*b* above the cubicle floor 51. In an alternative embodiment, the manure slide or another contact cleaning device may be mounted in a fixed position with respect to the main body 2.

The vehicle 1 is driven in the driving direction indicated by arrow A to position the manure slide 5 pas a quantity of dirt 60, for example manure, to be cleaned from the cubicle floor 51. During the movement of the vehicle 1 with its cleaning side 2*b* over the cubicle floor 51 the air blower device is activated to blow dry litter material away from the area to be cleaned, so that this material is not undesirably discarded together with the dirt 60.

When the cleaning side 2*b* is moved over the area of the cubicle floor to be cleaned and/or when the wheels 4 are driven against the threshold between the stable floor 50 and the cubicle floor 51, the main body 2 can be moved to the cleaning position to start cleaning of the cubicle floor 51. Before the actuator 14 is actuated to move the support arm 13 to the second position, the manure slide 5 is rotated about the rotation axis 8 to a cleaning position, for example the first cleaning position for cleaning the cubicle floor 51.

Then the support arm 13 can be moved to the first position, so that the main body 2 will tilt to the cleaning position. In this cleaning position, the vehicle will be supported by the wheels 4 and by the manure slide 5. By driving the wheels in the opposite direction, the vehicle 1 can be moved in a second driving direction opposite to the driving direction A.

FIG. 7 shows the vehicle 1 during the movement of the vehicle in the second driving direction indicated by arrow B. In this movement the dirt 60 will be scraped by the manure slide 5 from the cubicle floor 51 onto the stable floor 50.

During this movement in the second driving direction B, the litter material spreading device 8 may be activated to spread litter material 70 on the cubicle floor 51 where the manure slide 5 has passed the respective part of the cubicle floor 51.

When the dirt 60 has substantially been scraped from the cubicle floor 51 onto the stable floor 50, the vehicle 1 can be brought back to the stable floor 50. This can be done by moving the vehicle in the second driving direction B until the vehicle is completely supported on the stable floor 50. Guiding means may be provided to guide the movement of the vehicle from the cubicle floor 51 to the stable floor 50. It may also be possible to move the main body to the tilted position, so that the vehicle 1 will not fall with its cleaning side 2*b* from the threshold between the stable floor 50 and the cubicle floor 51.

It is remarked that a slide block or other support element may be provided at the cleaning side 2*b* to support the cleaning side 2b of the main body 2 when the manure slide 5 is no longer positioned on the cubicle floor 51.

After the vehicle 1 is completely supported on the stable floor 1 it may move to another part of the cubicle floor 51 for cleaning, or it may be used to clean the stable floor 50. However, other vehicles may be provided to clean the stable floor 50 so that the vehicle 1 is mainly used to clean cubicle floors 51. When required, the vehicle 1 may also return to the home station 40 for recharging of the batteries or filling of the container 8 with litter material.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An autonomous unmanned wheeled vehicle for cleaning the floor of an accommodation of an animal, the vehicle being configured to clean a first floor surface that is at a first height level, while the vehicle is at least partially being supported on a second floor surface that is at a second height level, wherein the first height level is higher than the second height level, wherein the vehicle comprises:
    a main body comprising a support side and a cleaning side, and
    a support device connected to the main body at the support side thereof to at least partially support the main body on the second floor surface,
    wherein the main body comprises at the cleaning side a contact cleaning device configured to clean the first floor surface by moving over the first floor surface while in contact with the first floor surface,
    wherein
    the vehicle comprises a tilting device to automatically tilt the main body between a tilted position in which the cleaning side of the main body is movable over the first floor surface without contact between the contact cleaning device and the first floor surface, and a cleaning position, in which the contact cleaning device is in contact with the first floor surface, when the cleaning side is moved over the first floor surface.

2. The vehicle of claim 1, wherein the contact cleaning device comprises a manure scraper device mounted at the cleaning side of the main body, wherein in the cleaning position of the vehicle, the manure scraper device will extend from the main body down to or below the first height level, and in the tilted position the manure scraper device is spaced from the first height level.

3. The vehicle of claim 1, wherein the main body is pivotable with respect to the support device about a pivot axis, and wherein the tilting device is configured to change a relative position of the pivot axis with respect to the main body between a first position in which a center of mass of the main body is located at one side of the pivot axis, and a second position in which the center of mass of the main body is located at an opposite side of the pivot axis.

4. The vehicle of claim 3, wherein the support device comprises one or more wheels rotatable about a substantially horizontal axis of rotation, and wherein the pivot axis is formed by the axis of rotation.

5. The vehicle of claim 4, wherein the one or more wheels define a main direction of movement over the second floor surface substantially perpendicular to the axis of rotation.

6. The vehicle of claim 5, wherein the support device comprises a pivotable support arm, wherein a first end of the pivotable support arm is pivotably mounted on the main body, and wherein the one or more wheels are mounted on a second end of the pivotable support arm, wherein a pivoting movement of the pivotable support arm with respect to the main body moves the pivot axis between the first position and the second position, and wherein the tilting device comprises at least one actuator to pivot the pivotable support arm with respect to the main body.

7. The vehicle of claim 1, wherein the main body is pivotable with respect to the support device about a pivot axis, and wherein the tilting device comprises a movable mass, wherein the movable mass is movable between a first position in which a center of mass of the main body is located at one side of the pivot axis, and a second position in which the center of mass of the main body is located at an opposite side of the pivot axis, and wherein the tilting device comprises at least one actuator to move the movable mass between the first and second position.

8. The vehicle of claim 1, wherein the tilting device comprises an extendable support element movable between a retracted position wherein the vehicle is in the cleaning position, and an extended position in which the support element extends downwards from the main body and wherein the vehicle is in the tilted position.

9. The vehicle of claim 1, wherein the vehicle comprises one or more air blowers.

10. The vehicle of claim 1, wherein the vehicle comprises a spreading device for spreading a litter material such as sawdust or straw, the spreading device comprising a container for holding the litter material.

11. The vehicle of claim 1, wherein the contact cleaning device is configured to also clean the second floor surface and/or the vehicle comprises a second contact cleaning device to clean the second floor surface.

12. The vehicle of claim 11, wherein the contact cleaning device comprises a manure slide, wherein the manure slide is movable between a first cleaning position for cleaning the first floor surface and a second cleaning position for cleaning the second floor surface.

13. The vehicle of claim 1, wherein the vehicle comprises at least one sensor, each configured to provide a sensor signal, and a control device configured to control the tilting device and/or to control movements of the vehicle on the basis of said at least one sensor signal.

14. The vehicle of claim 1, wherein the first floor surface is a cubicle floor and the second floor surface is a stable floor.

15. A method of using an unmanned vehicle as claimed in claim 1, to clean a first floor surface at a first height level, while the vehicle is at least partially supported on a second floor surface at a second height level, wherein the first height level is higher than the second height level, the method comprising the steps of:
    moving the cleaning side of the main body in a first direction over at least a part of the first floor surface to be cleaned, while the main body is in the tilted position,
    transferring the main body from the tilted position to the cleaning position,
    cleaning the first floor surface with the contact cleaning device by moving the main body in a second direction, opposite to the first direction, while the main body is in the cleaning position.

16. The vehicle of claim 2, wherein the main body is pivotable with respect to the support device about a pivot axis, and wherein the tilting device is configured to change a relative position of the pivot axis with respect to the main body between a first position in which a center of mass of the main body is located at one side of the pivot axis, and a second position in which the center of mass of the main body is located at an opposite side of the pivot axis.

17. The vehicle of claim 2, wherein the main body is pivotable with respect to the support device about a pivot axis, and wherein the tilting device comprises a movable mass, wherein the movable mass is movable between a first position in which a center of mass of the main body is located at one side of the pivot axis, and a second position in which the center of mass of the main body is located at an opposite side of the pivot axis, and wherein the tilting device comprises at least one actuator to move the movable mass between the first and second position.

18. The vehicle of claim 2, wherein the tilting device comprises an extendable support element movable between a retracted position wherein the vehicle is in the cleaning position, and an extended position in which the support element extends downwards from the main body and wherein the vehicle is in the tilted position.

19. The vehicle of claim 2, wherein the vehicle comprises one or more air blowers.

20. The vehicle of claim 3, wherein the vehicle comprises one or more air blowers.

* * * * *